United States Patent
Heller et al.

(10) Patent No.: US 11,396,279 B2
(45) Date of Patent: Jul. 26, 2022

(54) EMERGENCY STOP SYSTEM FOR A VEHICLE

(71) Applicant: ZF Friedrichshafen AG, Friedrichshafen (DE)

(72) Inventors: Carolin Heller, Achberg (DE); Michael Amann, Tettnang (DE); Alexander Beck, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 68 days.

(21) Appl. No.: 16/761,808

(22) PCT Filed: Oct. 17, 2018

(86) PCT No.: PCT/EP2018/078325
§ 371 (c)(1),
(2) Date: May 6, 2020

(87) PCT Pub. No.: WO2019/091726
PCT Pub. Date: May 16, 2019

(65) Prior Publication Data
US 2021/0179037 A1    Jun. 17, 2021

(30) Foreign Application Priority Data
Nov. 12, 2017   (DE) .................. 10 2017 126 513.9

(51) Int. Cl.
*B60T 7/12*    (2006.01)
*B60K 28/00*    (2006.01)
(Continued)

(52) U.S. Cl.
CPC ............... *B60T 7/12* (2013.01); *B60K 28/00* (2013.01); *B60W 10/182* (2013.01); *B60W 30/18109* (2013.01); *B60Y 2302/05* (2013.01)

(58) Field of Classification Search
None
See application file for complete search history.

(56) References Cited

U.S. PATENT DOCUMENTS 9,523,984 B1    12/2016   Herbach et al.
9,811,086 B1    11/2017   Poeppel et al.
(Continued)

FOREIGN PATENT DOCUMENTS

DE         19829374 A1     1/2000
DE      102005016001 A1    10/2006
(Continued)

OTHER PUBLICATIONS

The European Parliament and the Counsel of the European Union, Norm "Regulation (EC) No. 661/2009 of the European Parliament and of the Council of Jul. 13, 2009 concerning type-approval requirements for the general safety of motor vehicles, their trailers and systems, components and separate technical units intended therefor (Text with EEA relevance)," Official Journal of the European Union, Jul. 2009, pp. 1-24, European Union, Luxembourg, Luxembourg.

*Primary Examiner* — Jonathan M Dager
(74) *Attorney, Agent, or Firm* — Leydig, Voit & Mayer, Ltd.

(57) ABSTRACT

An emergency stop system for transferring an at least semi-autonomously operable vehicle into a safe state includes an actuating device configured to output an actuating signal, a control device configured to receive the actuating signal and to output a control signal, and an emergency braking device configured to actively brake the vehicle. The emergency braking device is configured to actuate a braking system provided in the vehicle based on the output control signal and based on a predetermined operating mode in order to generate a braking force for decelerating the vehicle.

18 Claims, 2 Drawing Sheets

(51) Int. Cl.
*B60W 10/18* (2012.01)
*B60W 30/18* (2012.01)

(56) References Cited

U.S. PATENT DOCUMENTS

| | | | |
|---|---|---|---|
| 10,124,777 B2* | 11/2018 | Gomes | B60T 8/266 |
| 10,589,738 B1* | 3/2020 | Boecker | B60W 10/18 |
| 10,981,579 B2* | 4/2021 | Schulz | B60W 30/10 |
| 10,994,744 B2* | 5/2021 | Kanoh | B60W 50/082 |
| 2006/0225971 A1 | 10/2006 | Jaeger | |
| 2012/0245815 A1* | 9/2012 | Schneider | B60T 7/107 |
| | | | 701/70 |
| 2013/0144465 A1* | 6/2013 | Shida | B60W 30/16 |
| | | | 701/1 |
| 2015/0345580 A1 | 12/2015 | Jung | |
| 2016/0304124 A1* | 10/2016 | Fujiyoshi | B62D 15/025 |
| 2017/0090480 A1 | 3/2017 | Ho et al. | |
| 2017/0147959 A1 | 5/2017 | Sweeney et al. | |
| 2017/0240167 A1 | 8/2017 | Lu et al. | |
| 2017/0267234 A1* | 9/2017 | Kemp | G08G 1/165 |
| 2017/0297567 A1* | 10/2017 | Matsumura | B60K 28/06 |
| 2018/0065611 A1* | 3/2018 | Matsuura | B60T 13/686 |
| 2018/0126981 A1* | 5/2018 | Gangwar | B60W 30/18109 |
| 2018/0345937 A1 | 12/2018 | Winkler et al. | |
| 2018/0362013 A1 | 12/2018 | Ungermann | |
| 2019/0283769 A1* | 9/2019 | Chiba | B60W 50/10 |
| 2021/0078556 A1* | 3/2021 | Laine | B60T 8/321 |
| 2021/0139036 A1* | 5/2021 | Kim | G10L 15/32 |
| 2021/0171062 A1* | 6/2021 | Hecker | B60W 50/023 |
| 2021/0191403 A1* | 6/2021 | Rastoll | G05D 1/0214 |

FOREIGN PATENT DOCUMENTS

| | | |
|---|---|---|
| DE | 102016203020 A1 | 8/2017 |
| DE | 102017102954 A1 | 8/2017 |
| EP | 2671768 A1 | 12/2013 |
| WO | 2017097695 A1 | 6/2017 |

\* cited by examiner

EMERGENCY STOP SYSTEM FOR A VEHICLE

CROSS REFERENCE TO RELATED APPLICATIONS

This application is a U.S. National Stage Application under 35 U.S.C. § 371 of International Application No. PCT/EP2018/078325 filed on Oct. 17, 2018, and claims benefit to German Patent Application No. DE 10 2017 126 513.9 filed on Nov. 12, 2017. The International Application was published in German on May 16, 2019 as WO 2019/091726 A1 under PCT Article 21(2).

FIELD

The present invention relates to emergency stop systems for a vehicle and to methods for performing an emergency stop of a vehicle.

BACKGROUND

Known systems for transferring semi-autonomous or autonomous vehicles into a safe state are capable of stopping the vehicle by stopping the drive.

A safe state can be understood to be a state in which the vehicle is at least stopped so that a risk which can originate from a movement of the vehicle is eliminated. A safe state can also be understood to be a state in which no danger to the surroundings arises from the vehicle. A safe state can be understood in particular to be a state in which the vehicle is stopped and/or potentially dangerous systems are switched off in addition to the drive. Such potentially dangerous systems can be, for example, a hydraulic system or a power take-off system.

A semi-autonomous vehicle can be understood to be a vehicle which can travel autonomously in the presence of a driver. Such an operating mode is also known as autopilot. An autonomous vehicle is understood to be a vehicle which can travel completely independently without a driver.

A vehicle can, in principle, be any means for transporting people or goods. A vehicle can, in particular, be agricultural machinery, for example a tractor, a passenger car, a commercial vehicle, for example a truck or a dumper, or a construction machine, for example a wheel loader.

SUMMARY

In an embodiment, the present invention provides an emergency stop system for transferring an at least semi-autonomously operable vehicle into a safe state. The emergency stop system includes an actuating device configured to output an actuating signal, a control device configured to receive the actuating signal and to output a control signal, and an emergency braking device configured to actively brake the vehicle. The emergency braking device is configured to actuate a braking system provided in the vehicle based on the output control signal and based on a predetermined operating mode in order to generate a braking force for decelerating the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
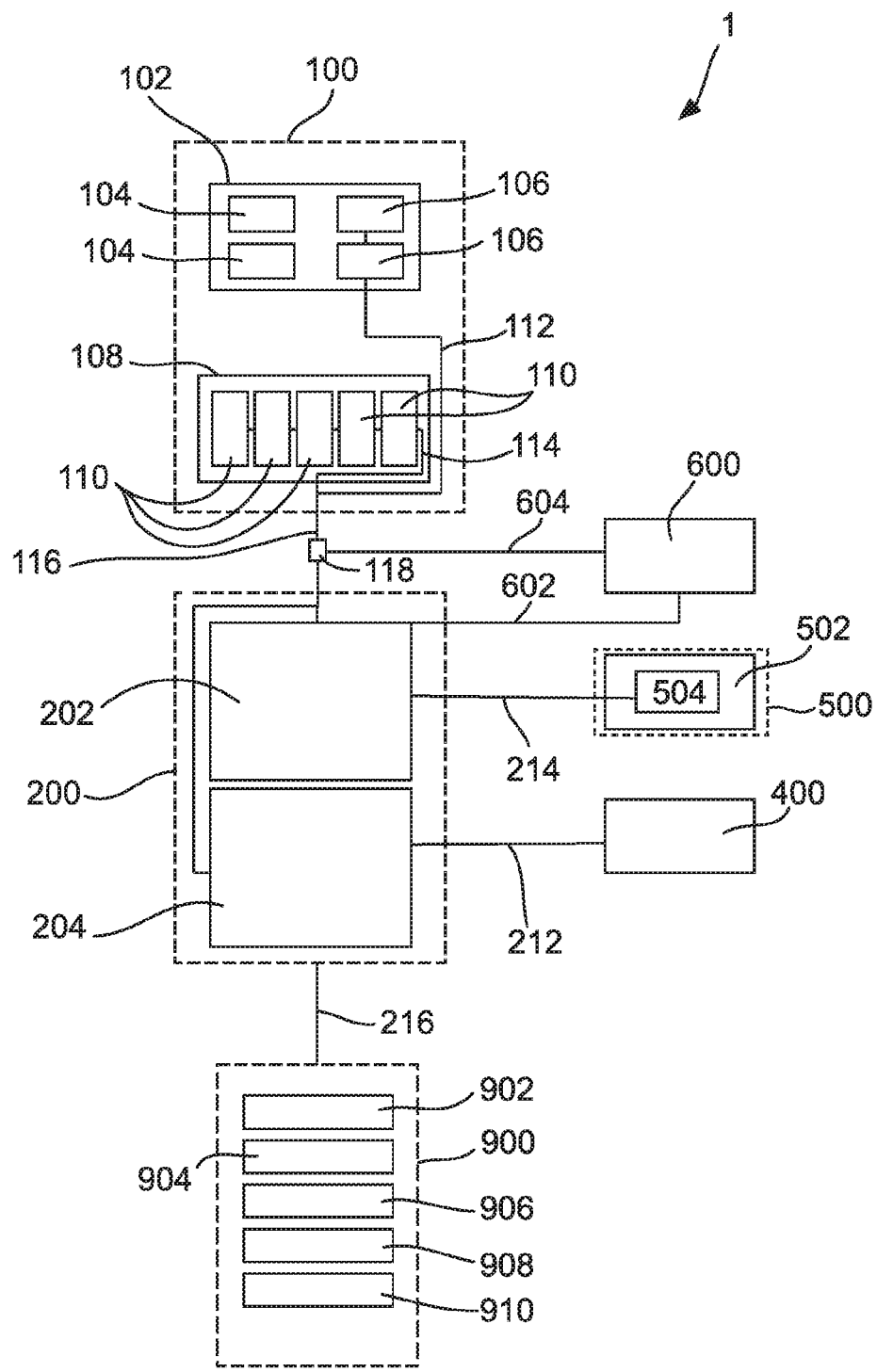
FIG. 1 shows a conceptual illustration of an emergency stop system in accordance with one embodiment.

An emergency stop system of the type proposed can be used for a vehicle that can be operated at least semi-autonomously and serves to transfer the vehicle into the safe state mentioned at the outset. A vehicle that can be operated at least semi-autonomously is understood to be a vehicle which can be put into an operating state in which it is operated semi-autonomously in the manner described above, and accordingly can travel autonomously in the presence of the driver.

The emergency stop system has an actuating device which can output an actuating signal in response to actuation thereof. Such an actuating device may be any type of device that outputs a signal based on a trigger event. Such an actuating device can also be referred to as a trigger. The actuating device can be actuated by a user, for example an operator of the vehicle. An actuating device is thus to be understood as any type of device which, in response to an actuation by a user, generates an output which is suitable for further processing in a control device. Such an output may be a specifically generated signal but may also be realized by simply turning a current on and off.

The emergency stop system furthermore has a control device, which receives the actuating signal and outputs a control signal based on the actuating signal. Such a control signal can be generated in particular taking into account further system information and is available for controlling further system components. The control device may combine a plurality of control devices for controlling various system components.

In addition, the emergency stop system has an emergency braking device for actively braking the vehicle. This emergency braking device is configured to actuate a braking system provided, for example, already present, in the vehicle based on the output control signal and based on a predetermined operating mode in order to generate a braking force for decelerating the vehicle. For this purpose, the control device may have a brake control device for outputting the control signal.

Active braking means that a braking force is generated mechanically in the drive train of the vehicle, in particular using an on-board braking system, in order to decelerate a movement of the vehicle. The braking system is actuated in this case based on the output control signal and based on a predetermined operating mode to generate a braking force for decelerating the vehicle. The braking system may be a parking braking system, which may also be referred to as a manual braking system or hand brake.

By using the on-board braking system, an efficient and safe emergency stop system is provided which increases the safety of the vehicle using already existing components of the vehicle. In contrast to a simple shutdown of a vehicle drive, it is possible to brake the vehicle more quickly. In addition, the shutdown of the vehicle drive can be dispensed with, as a result of which the drive continues to be available after the safe state is reached. Thus, in the event of an emergency stop, the vehicle drive can continue to drive a generator of the vehicle, whereby the load on the vehicle battery is relieved.

The emergency braking device may comprise an actuator configured to actuate the braking system, e.g., the parking braking system. In this way, it is possible to actuate the parking braking system automatically. The actuator may be an electromechanical actuator. The actuator may have an electric motor, a final control element and a signal generator. The signal generator is capable of outputting a position of the final control element as a signal and of making the latter available for controlling the electric motor. Such a signal generator may be a limit switch. Instead of a signal generator, however, a position of the final control element can also be determined with a continuous measuring system, for example via a feedback current. The actuator can additionally be provided in the vehicle. If the vehicle already has an electromechanical actuator for actuating a parking brake, this already existing actuator can be actuated directly and thus be regarded as a part of the emergency braking device. As an alternative or in addition to the parking braking system, a parking lock can also be engaged in the vehicle if such a parking lock is present in the vehicle.

In order to generate an additional braking force for decelerating the vehicle in addition to the braking force generated in the braking system, the control device can be configured to actuate a device of the vehicle that is external to the braking system. In this way, particularly rapid and efficient braking can be achieved.

The device of the vehicle that is external to the braking system may be a drive train of the vehicle. The control device can be configured to switch the drive train in such a way that an internal resistance of the drive train is used as additional braking force. This can be done, for example, by targeted activation of a transmission or by corresponding switching of differentials. In this way, already existing components in the drive train can be used for additional braking. This can contribute to cost savings since already existing vehicle components are used.

The transmission can be controlled in such a way that after a predetermined, for example freely parameterizable, time has elapsed, the transmission is switched to neutral. A starting clutch can also be provided, which is opened after the predetermined time has elapsed. In this way, the force flow can be interrupted. The transmission can have a clutch in the power flow, which clutch can be actively closed, for example by energizing. In such a clutch, only the energization is interrupted, the clutch is opened and the drive train is thus permanently switched off. The control device can accordingly be configured to actuate the transmission at least temporarily in such a way that an engine braking is generated. The additionally generated braking force is therefore adjustable, as a result of which braking can take place more efficiently overall.

The control device may have a transmission control device. Depending on the type of transmission used, this transmission control device can shift the transmission to a low gear in order to generate a braking force or can set a low speed setpoint for the transmission. For example, the transmission may be an automated manual transmission. In order to generate a braking effect, this transmission can be temporarily shifted into a low setpoint gear. The transmission may also be a hydrostatically power-split transmission. In this case, a speed setpoint, for example 0 km/h, can be set for the transmission. Such a transmission control enables a particularly efficient generation of a braking force.

The emergency stop system may have a mode setting device that is configured to selectively inhibit activation of the emergency braking device by the actuating device. Such a mode setting device can be a switch, for example a key switch. This can be actuated by a user and can release or block different operating modes via an electrical circuit depending on the key switch position. For example, a two-wire key switch can be provided, which can encode a total of four modes into binary digits. For example, the emergency braking device can be activated by decoupling the actuating device from the control device, for example by interrupting or blocking the signal transmission from the actuating device to the control device. The switch may be statically attachable to the vehicle. This has the advantage that the mode setting device cannot be actuated inadvertently by remote triggering.

The mode setting device can additionally be configured to provide the transmission control device with different operating modes for the transmission. The mode setting device can thus, for example, not only actuate the brake control device, i.e., activate or deactivate the brake, but can set a speed limit in certain operating modes, for example a semi-autonomous or autonomous operation. Such a speed limit can be freely parameterizable in the transmission control. This function can be used for the first phases of product development, for example in prototypes or first series production launches, until a sufficient confidence level of the product functions is present.

In addition to a semi-autonomous operation and an autonomous operation, the transfer journey mode can also be provided as an operating mode. Transfer journey is to be understood as a vehicle's original state in which no changes with regard to the control are active, for example the control device is inactive. This is particularly important in prototype vehicles in order to not lose vehicle approval. The transfer journey mode may also place the vehicle in a state in which it may be operated at a higher speed. At the same time, however, actuation of the emergency braking device is prevented since actuation and associated braking can lead to destabilization of the vehicle.

The actuating device can have a remote triggering unit consisting of a transmitter and a receiver. The remote triggering unit enables actuation remote from the vehicle. Actuation by an operator, therefore, does not have to take place at the vehicle. Additionally or alternatively, the actuating device can have an on-board actuating unit which enables actuation at the vehicle. Such an on-board actuating unit can have one or more emergency stop switches, also simply referred to as switches or pushbuttons, whose signals are transmitted via a cable in each case. This type of on-board actuating unit therefore has a low error rate. Alternatively, the transmission can take place via a bus system, in particular via a CAN bus system.

For example, the on-board actuating unit may have four emergency stop switches, wherein one emergency stop switch each may be provided on each vehicle side on the vehicle. In particular, the emergency stop switches can be provided on the vehicle in such a way that they can be actuated by a user without the user having to go into a danger zone of the vehicle, for example wheels. If the vehicle has a vehicle cabin, an additional emergency stop switch may be provided in the vehicle cabin.

The remote triggering unit can have a plurality of, preferably two, transmitters and receivers, and the on-board actuating unit can have a plurality of switches or pushbuttons. The receivers or switches and pushbuttons can be connected in such a way that the actuation of a transmitter or switch or pushbutton results in the output of an actuating signal.

The actuating device can have a surroundings monitoring system which is configured to output the actuating signal as a function of detected objects in the surroundings of the vehicle. The surroundings monitoring system can have a sensor system for detecting the surroundings. In principle, any desired sensor system for detecting the surroundings can be provided. A camera or a scanning detection unit can be provided as a sensor. As an alternative or in addition, a temperature camera, which generates a temperature image as image information, or a 3D camera, which generates a depth image as image information, can be provided as a sensor.

A vehicle can be provided which can be operated at least semi-autonomously and has a parking braking system and an emergency stop system according to any one of the preceding claims.

The emergency stop system may have a transmitter and a receiver that receives a radio signal sent by the transmitter. The received signal can be passed to the control device, in particular the brake control device, for processing. The control device can generate a signal for controlling the actuator. The actuator can be operatively connected to and actuate a parking brake or hand brake of the vehicle. The actuator can consist of an electric motor, gear wheels and spindle mechanics as well as a traction rope or a tie rod. Traction rope or tie rod can be connected to a lever for parking brake actuation. Said lever can be provided in addition to a manually actuatable lever for parking brake actuation and can act on the already existing parking brake mechanism. Further components of the parking brake can be a brake shaft and brake disks.

A transmission control device, a key switch and a plurality of subsystems may also be provided. The subsystems may be activated or disabled depending on key switch position and actuating device signal. Examples of subsystems are a steering system, a vehicle gateway, front hydraulics, rear hydraulics, a power take-off system and a rotating beacon. The output of the receiver can be connected directly to an input of the transmission control device. The input may be a digital input. The input may already have electrical monitoring, for example short-circuit detection. In particular, the input can be supplied via its own, pulsed voltage supply for this purpose. The output of the receiver can also be connected directly to an input of the brake control device. The brake control device can trigger braking when a corresponding signal is present at the input. The signal may be in the form of a voltage value and the braking function may be triggered when the voltage value exceeds or falls below a threshold value.

Furthermore, the emergency stop system can be configured to switch off all auxiliary units that can be actuated directly via the transmission, when the actuating device is actuated. For example, a rear power take-off shaft may be switched off. The emergency stop system may moreover be configured such that all driver inputs are deactivated with the exception of an on-board brake. For example, inputs can be deactivated via an accelerator pedal or via a hand throttle lever as well as via a cruise control. The on-board brake can be actuatable independently of the emergency braking device and thereby continue to remain available to a driver.

An additional advantage of the above overall system is that troubleshooting can be performed with a multimeter.

Two or more of the aforementioned subsystems can be connected via a single relay, which reduces installation costs.

Instead of using a brake control device for actuating the braking system and a transmission control device, the function of the brake control device can also be realized by software in the transmission control device.

Hereinafter, embodiments of the present disclosure are described with reference to the drawings.

FIG. 1 shows an embodiment of an emergency stop system 1. The emergency stop system 1 has an actuating device 100 consisting of a remote actuating unit 102 and an on-board actuating unit 108. The remote actuating unit 102 has two transmitters 104 and two receivers 106, with one transmitter 104 each associated with a receiver 106. Actuation of the transmitters 104 is wirelessly transmitted to the receivers 106 by radio. The receivers 106 are connected such that actuation of a single transmitter 104 already results in the output of a signal from the remote actuating unit 102 via a signal line 112. In the embodiment, the on-board actuating unit 108 has five emergency stop switches 110, one of which is arranged in the vehicle close to an operator, and one emergency stop switch 110 respectively is provided externally on the vehicle on one vehicle side respectively. The emergency stop switches 110 are connected such that actuation of a single switch 110 results in the output of a signal from the on-board actuating unit 108 via a signal line 114. The signals of the signal lines 112, 114 are output from the actuating device 100 via a signal line 116.

The emergency stop system 1 furthermore comprises a control device 200 which is connected to the signal line 116 and can thus receive the signals of the actuating device 100. In the embodiment, the control device 200 consists of a brake control device 204 and a transmission control device 202.

The brake control device 204 is a manual brake control device or parking brake control device and is connected to an emergency braking device 400 via a signal line 212.

The emergency braking device 400 has an actuator 700 in the form of an electromechanical actuator. The actuator 700 has an electric motor 702, a power transmission mechanism 704 consisting of a spindle and a piston, and a tie rod 706.

Figure 2:
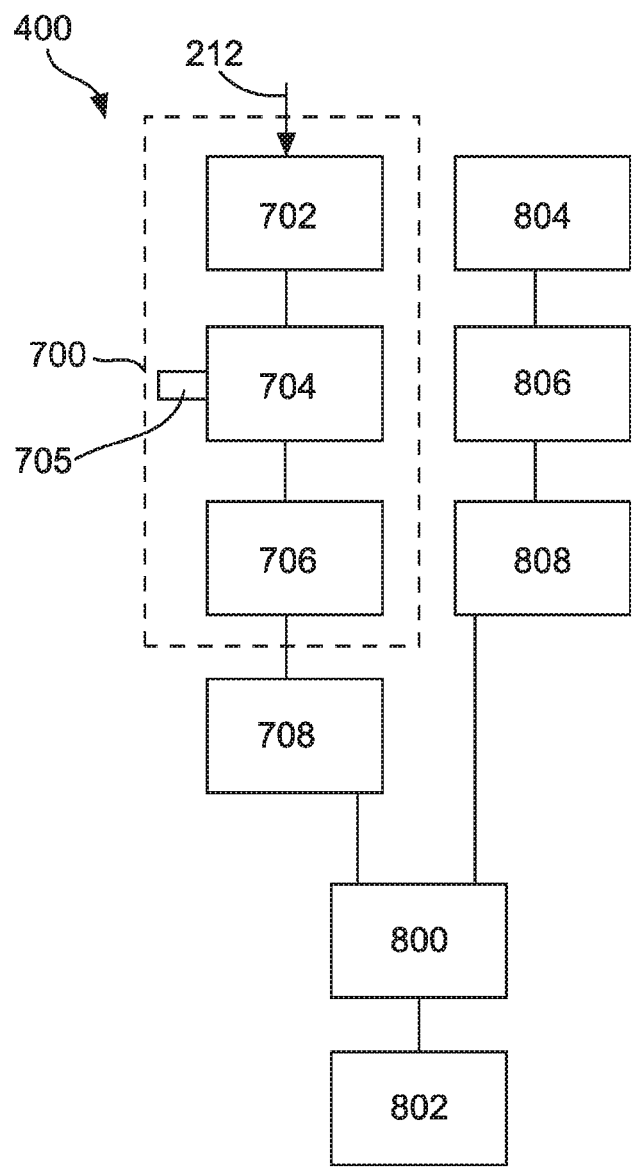
FIG. 2 schematically shows an emergency braking device of the emergency stop system of FIG. 1.

The power transmission mechanism 704 has limit switches 705 as signal generators which, when the piston is in end positions on the spindle, output a signal to the brake control device 204 to stop the electric motor 702. When the brake is actuated, the piston is in an end position and when the brake is completely disengaged, the piston is in another end position. The tie rod 706 is connected to a lever 708. The lever 708 is connected to a brake shaft 800 which is connected to a disk brake 802. The brake shaft 800 is also connected to further components of an on-board hand brake. Said components comprise a hand brake lever 804 operatively connected to a lever 808 via a Bowden cable 806. The lever 808 is connected to the brake shaft 800. This structure can be seen in FIG. 2.

The transmission control device 202 is connected via a signal line 214 to a transmission 504 which is part of a drive train 502 of the vehicle and is thus part of a device 500 that is external to the braking system. The transmission control device 202 controls the transmission 504 in such a way that a supporting braking force is temporarily generated when the actuating device is actuated. In the embodiment, the transmission is a hydrostatically power-split transmission. In order to generate the supporting braking force, the transmission control device 202 provides the transmission 504 with a speed setpoint of 0 km/h. After a predetermined time has elapsed, the transmission 504 is switched to neutral so that no force is introduced from the drive into the drive train.

The emergency stop system 1 furthermore comprises a mode setting device 600 in the form of a key switch. In the embodiment, said key switch can switch between the operating modes of non-autonomous transfer journey, semi-autonomous driving and autonomous driving. The mode setting device 600 is connected to the transmission control device 202 via a signal line 602. Furthermore, the mode setting device 600 is connected via a signal line 604 to an interrupter 118 which is arranged in the signal line 116 and can interrupt it so that no signal can be transmitted via the signal line 116.

In the non-autonomous transfer journey mode, the interrupter 118 is active. A signal generated in the actuating device is therefore not transmitted to the control device 200. In other words, the actuating device 100 is switched to inactive. Moreover, a signal is transmitted to the transmission control device 202 in order to allow a higher driving speed in comparison with the other operating modes.

The interrupter 118 is inactive in the semi-autonomous driving mode and the autonomous driving mode. Thus, a signal generated in the actuating device 100 is transmitted to the control device 200. The actuating device 100 is thus switched to active and an emergency stop can be triggered.

The emergency stop system 1 according to the embodiment is also configured to control subsystems 900. For this purpose, the control device 200 is connected to the subsystems 900 via a signal line 216. The subsystems 900 in the embodiment comprise auxiliary steering hydraulics 902, a gateway 904, front hydraulics 906, rear hydraulics 908, a power take-off system 910 (PTO). These subsystems 900 are switched off with the aid of relays in response to actuation of the actuating device 100. Thus, in addition, all potentially dangerous systems are switched off.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Emergency stop system
100 Actuating device
102 Remote triggering unit
104 Transmitter
106 Receiver
108 On-board actuating unit
110 Emergency stop switch
112 Signal line
114 Signal line
116 Signal line
118 Interrupter
200 Control device
202 Transmission control device
204 Brake control device
212 Signal line
214 Signal line
216 Signal line
400 Emergency braking device
500 Device external to the braking system
502 Drive train
504 Transmission
600 Mode setting device
602 Signal line
604 Signal line
700 Actuator
702 Electric motor
704 Force transmission mechanism
705 Signal generator/limit switch
706 Tie rod
708 Lever
800 Brake shaft
802 Disk brake
804 Hand brake lever
806 Bowden cable
808 Lever
900 Subsystems
902 Auxiliary steering hydraulics
904 Gateway
906 Front hydraulics
908 Rear hydraulics
910 Power take-off system

The invention claimed is:

1. An emergency stop system for transferring an at least semi-autonomously operable vehicle into a safe state, the emergency stop system comprising:
an actuating device configured to output an actuating signal;
a control device configured to receive the actuating signal and to output a control signal;
an emergency braking device configured to actively brake the vehicle; and
an interrupter arranged in a signal line from the actuating device to the control device,
wherein the emergency braking device is configured to actuate a braking system provided in the vehicle based on the output control signal and based on a predetermined operating mode of the vehicle in order to generate a braking force for decelerating the vehicle,
wherein the actuating device is configured to be switched, in at least a first operating mode of the vehicle, to an inactive state wherein the signal line from the actuating device to the control device is interrupted,
wherein the actuating device is configured to be switched, in at least a second operating mode of the vehicle, to an active state wherein the signal line from the actuating device to the control device is not interrupted, wherein the first operating mode is a non-autonomous driving mode and the second operating mode is a semi-autonomous driving mode or a fully autonomous driving mode, and wherein the interrupter is configured to interrupt the signal line from the actuating device to the control device in the first operating mode.

2. The emergency stop system according to claim 1, wherein the braking system is a parking braking system, and wherein the emergency braking device is configured to actuate the parking braking system.

3. The emergency stop system according to claim 2, further comprising:

an actuator configured to actuate the braking system, wherein the actuator is an electromechanical actuator with an electric motor, a final control element and a signal generator configured to output a position of the final control element as a signal which is fed back for controlling the electric motor.

4. The emergency stop system according to claim 1, wherein the control device is further configured to actuate a device of the vehicle that is external to the braking system in order to generate an additional braking force for decelerating the vehicle in addition to the braking force generated by the braking system.

5. The emergency stop system according to claim 4, wherein the device that is external to the braking system is a drive train of the vehicle, and wherein the control device is configured to switch the drive train in such a way that an internal resistance of the drive train is used as additional braking force.

6. The emergency stop system according to claim 5, wherein the drive train has a transmission and the control device is configured to actuate the transmission at least temporarily in such a way that engine braking is generated.

7. The emergency stop system according to claim 6, wherein the control device comprises a transmission control device which, according to a design of a controlled transmission, is configured to shift the transmission to a low gear in order to generate a braking force or to provide the transmission with a low speed setpoint.

8. The emergency stop system according to claim 1, further comprising a mode setting device configured to selectively prevent activation of the emergency braking device by the actuating device.

9. The emergency stop system according to claim 8, wherein the mode setting device is additionally configured to provide the transmission control device with different operating modes for the transmission.

10. The emergency stop system according to claim 8, wherein the mode setting device has a switch which can be statically attached to the vehicle.

11. The emergency stop system according to claim 1, wherein the actuating device has a remote triggering unit that includes a transmitter and a receiver and that enables actuation remote from the vehicle and/or has an on-board actuating unit which enables actuation on the vehicle.

12. The emergency stop system according to claim 1, wherein the actuating device comprises a surroundings monitoring system with a sensor system, which is configured to automatically output the actuating signal as a function of detected objects in the surroundings of the vehicle.

13. A vehicle, that can be operated at least semi-autonomously, the vehicle comprising:

a braking system;

a transmission; and an emergency stop system according to claim 1.

14. The emergency stop system according to claim 1, wherein the actuating device is configured to be switched, in the second operating mode and in a third operating mode, to the active state wherein the signal line from the actuating device to the control device is not interrupted, wherein the second operating mode is a semi-autonomous driving mode and the third operating mode is a fully autonomous driving mode.

15. The emergency stop system according to claim 1, further comprising a mode setting device connected to the interrupter via a second signal line, the mode setting device being configured to control the interrupter so as to interrupt the signal line from the actuating device to the control device in the first operating mode.

16. The emergency stop system according to claim 15, wherein the mode setting device is a switch disposed in the vehicle and configured to be actuated by a user of the vehicle.

17. The emergency stop system according to claim 15, wherein the mode setting device is connected, via a third signal line, to a transmission control device of the control device, the mode setting device being further configured to provide the transmission control device with different operating modes for the transmission.

18. The emergency stop system according to claim 17, wherein the transmission control device is configured to shift a transmission of the vehicle to a low gear to generate a braking force and/or to provide the transmission with a low speed setpoint.

* * * * *